United States Patent
Huang et al.

(10) Patent No.: US 10,367,717 B2
(45) Date of Patent: Jul. 30, 2019

(54) PROCESSING A FLOW ENTRY IN VXLAN

(71) Applicant: HANGZHOU H3C TECHNOLOGIES CO., LTD., Binjiang District, Hangzhou, Zhejiang (CN)

(72) Inventors: Linbo Huang, Beijing (CN); Feng Wang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 183 days.

(21) Appl. No.: 15/514,166

(22) PCT Filed: Sep. 25, 2015

(86) PCT No.: PCT/CN2015/090640
§ 371 (c)(1),
(2) Date: Mar. 24, 2017

(87) PCT Pub. No.: WO2016/045608
PCT Pub. Date: Mar. 31, 2016

(65) Prior Publication Data
US 2017/0257306 A1    Sep. 7, 2017

(30) Foreign Application Priority Data

Sep. 26, 2014  (CN) .......................... 2014 1 0502051

(51) Int. Cl.
*H04L 12/751* (2013.01)
*H04L 12/46* (2006.01)
*H04L 12/715* (2013.01)

(52) U.S. Cl.
CPC .......... *H04L 45/02* (2013.01); *H04L 12/4633* (2013.01); *H04L 12/4641* (2013.01); *H04L 45/64* (2013.01)

(58) Field of Classification Search
CPC . H04L 12/4633; H04L 12/4641; H04L 45/02; H04L 45/64
See application file for complete search history.

(56) References Cited

U.S. PATENT DOCUMENTS

2014/0195695 A1   7/2014  Okita
2015/0372840 A1*  12/2015 Benny ................. H04L 12/4675
                                                        370/409

(Continued)

FOREIGN PATENT DOCUMENTS

CN     102857416 A     1/2013
CN     103067245       4/2013

(Continued)

OTHER PUBLICATIONS

International Search Report and Written Opinion:, dated Dec. 24, 2015, PCT/CN2015/090640, State Intellectual Property Office of the P.R. China, 7 pages.

*Primary Examiner* — Mansour Oveissi
(74) *Attorney, Agent, or Firm* — Nolte Intellectual Property Law Group

(57) ABSTRACT

A controller generates a Software Defined Network (SDN) entry for a Virtual eXtensible Local Area Network (VXLAN) Tunnel End Point (VTEP). A Match field in the generated SDN entry contains a VXLAN Network Identifier (VNI) corresponding to the SDN entry. The controller sends the generated SDN entry to the VTEP.

20 Claims, 3 Drawing Sheets

(56) References Cited

U.S. PATENT DOCUMENTS

2016/0014241 A1* 1/2016 Tai .................. H04L 12/4633
370/474
2016/0323189 A1* 11/2016 Ahn .................. H04L 47/6215

FOREIGN PATENT DOCUMENTS

| CN | 103888386 A | 6/2014 |
| CN | 104065553 | 9/2014 |

* cited by examiner

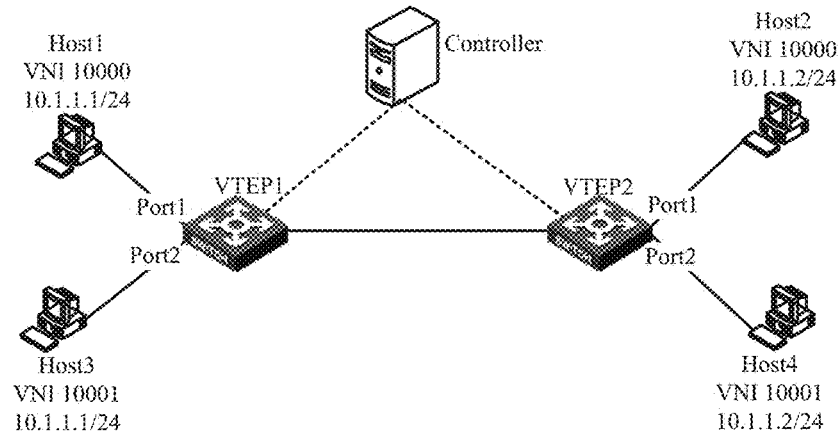

Match field of Openflow entry generated for VTEP1

| Serial number | Match |
|---|---|
| 1 | DIP: 10.1.1.1/32<br>OXM_OF_PBB_ISID: 10000 |
| 2 | DIP: 10.1.1.2/32<br>OXM_OF_PBB_ISID: 10000 |
| 3 | DIP: 10.1.1.1/32<br>OXM_OF_PBB_ISID: 10001 |
| 4 | DIP: 10.1.1.2/32<br>OXM_OF_PBB_ISID: 10001 |

FIG. 1

A controller generates an Openflow entry for a VTEP. A Match field in the generated Openflow entry contains a VNI corresponding to the Openflow entry — S201

The controller sends the generated Openflow entry to the VTEP — S202

FIG. 2

PROCESSING A FLOW ENTRY IN VXLAN

BACKGROUND

Virtual eXtensible Local Area Network (VXLAN) is an overlay network technology, in which a message is encapsulated according to a Media Access Control (MAC) in User Datagram Protocol (UDP) method. For example, an original message may be encapsulated into a UDP message.

A VXLAN includes VXLAN Tunnel End Points (VTEPs) and a tenant network composed of multiple hosts. A VTEP is an edge device of the VXLAN, and may be implemented by a physical switch or a virtual switch. Any two VTEPs may be connected by a layer 3 network and communicate with each other through establishing a tunnel between them. In a VXLAN, the tenant network is identified by a VXLAN Network identifier (VNI). A source VTEP encapsulates a message received from a source host in a tenant network into a VXLAN message, and then sends the VXLAN message to a destination VTEP via a tunnel. The destination VTEP decapsulates the received VXLAN message into the message and sends the message to a destination host.

Software Defined Network (SDN) is a new type of network which may separate a control plane of a network device from a forwarding plane. In a SDN VXLAN combining a SDN and a VXLAN, a connection between a controller and a VTEP may be established according to an Openflow protocol or another SDN protocol. The controller distributes an SDN entry to the VTEP to control the forwarding of data flow on the VTEP. The controller distributes a generated SDN entry to the VTEP, and the VTEP converts the SDN entry into a routing forwarding entry and adds the routing forwarding entry to a routing forwarding table corresponding to a VNI in the SDN entry. A connection between the controller and the VTEP is established according to a Network Configuration (Netconf) protocol, and the controller configures the VTEP according to the Netconf protocol.

BRIEF DESCRIPTION OF THE DRAWINGS

Features of the present disclosure are illustrated by way of example and not limited in the following figure(s), in which like numerals indicate like elements, in which:

FIG. 1 is a diagram illustrating the structure of a SDN VXLAN according to an example of the present disclosure.

FIG. 2 is a flowchart illustrating a method for processing a flow entry in a VXLAN according to an example of the present disclosure.

DETAILED DESCRIPTION

Figure 3:
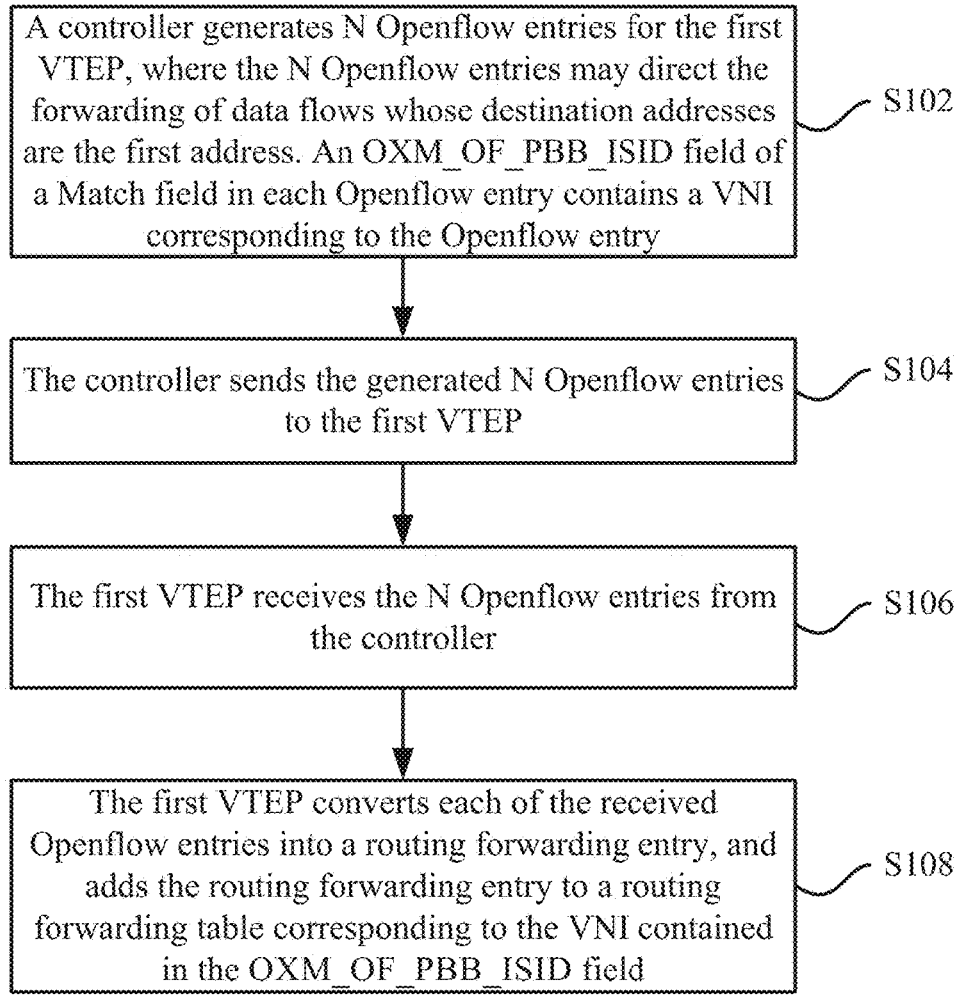
FIG. 3 is a flowchart illustrating a method for processing a flow entry in a VXLAN according to another example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A VXLAN supports overlapping of addresses of different tenants, and thus addresses of hosts belonging to different tenant networks may be the same. When addresses of N hosts that are connected to a VTEP but belongs to different tenant networks are the same, a controller generates N SDN entries for the VTEP. N is a natural number larger than 1, the addresses of N hosts are all called address 1, and the N SDN entries may direct the forwarding of data flows whose destination addresses are address 1. Contents in Match fields in the N SDN entries are the same, and priorities of the N SDN entries are the same. The SDN entries may for example be Openflow entries. From here on this disclosure SDN entries refer to Openflow entries for convenience, but it is to be understood that the Openflow entries may be substituted by entries according to another SDN protocol.

According to the Openflow protocol, an Openflow entry is identified by its Match field and priority. Accordingly, after the controller distributes the N Openflow entries to the VTEP, the VTEP is unable to differentiate the N Openflow entries on an Openflow protocol plane. Consequently, when converting each of the N Openflow entries into a routing forwarding entry, the VTEP is unable to determine a VNI corresponding to the Openflow entry, and thus is unable to determine that the routing forwarding entry converted from the Openflow entry can be added to a routing forwarding table corresponding to which VNI.

FIG. 1 is a diagram illustrating the structure of a SDN VXLAN according to an example of the present disclosure. In the SDN VXLAN shown in FIG. 1, VTEP1 is connected to Host1 via Port1 and is connected to Host3 via Port2. VTEP2 is connected to Host2 via Port1 and is connected to Host4 via Port2. Host1 and Host2 belong to a tenant network, for example, a VXLAN of VNI 10000. Host3 and Host4 belong to a tenant network, for example, a VXLAN of VNI 10001. Internet Protocol (IP) addresses of Host1 and Host3 are the same, and are both 10.1.1.1/24. IP addresses of Host2 and Host4 are the same, and are both 10.1.1.2/24.

The controller establishes VXLAN Tunnel ports called VXLAN Tunnel 1 on VTEP1 and VTEP2 respectively according to the Netconf protocol. The controller sets a remote IP address for each VXLAN Tunnel port. For example, the controller sets a destination IP address of VXLAN Tunnel 1 on VTEP1 is the IP address of VTEP2, and sets a destination IP address of VXLAN Tunnel 1 on VTEP2 is the IP address of VTEP1, so as to establish a tunnel connection between VTEP1 and VTEP2. After establishing the tunnel connection between VTEP1 and VTEP2, VTEP1 adds a tunnel header to an original message which is to be sent out from VXLAN Tunnel 1 on VTEP1, encapsulates the original message into a VXLAN message, and forwards the VXLAN message. The tunnel header is a UDP message header having multiple bytes on an outer layer. VTEP2 adds a tunnel header to an original message which is to be sent out from VXLAN Tunnel 1 on VTEP2, encapsulates the original message into a VXLAN message, and forwards the VXLAN message. The tunnel header is also a UDP message header having multiple bytes on an outer layer. VTEP1 pops up the tunnel header of the VXLAN message received from VXLAN Tunnel 1 on VTEP1, and forwards the obtained original message. VTEP2 pops up the tunnel header of the VXLAN message received from VXLAN Tunnel 1 on VTEP2, and forwards the obtained original message.

In order to implement data inter-communication among hosts belong to a tenant network, VETP1 and VTEP2 both save a routing forwarding table corresponding to VNI 10000 and a routing forwarding table corresponding to VNI 10001. In various examples, routing forwarding tables saved by VTEP1 are described.

The routing forwarding table corresponding to VNI 10000 on VTEP1 is shown in Table 1, and the routing forwarding table corresponding to VNI 10001 on VTEP1 is shown in Table 2.

TABLE 1

Routing forwarding table corresponding to VNI 10000

| Serial number | DIP (Destination IP address) | Output port | VNI |
|---|---|---|---|
| 1 | 10.1.1.1/32 | Port1 | N/A (invalid or null) |
| 2 | 10.1.1.2/32 | VXLAN Tunnel 1 | 10000 |

TABLE 2

Routing forwarding table corresponding to VNI 10001

| Serial number | DIP | Output port | VNI |
|---|---|---|---|
| 1 | 10.1.1.1/32 | Port2 | N/A |
| 2 | 10.1.1.2/32 | VXLAN Tunnel 1 | 10001 |

On VTEP1, Port1 is set to add to VNI 10000, and Port2 is set to add to VNI 10001.

Since the routing forwarding entry on the VTEP is converted from the Openflow entry distributed to the VTEP by the controller, the controller generates four Openflow entries for VTEP1. Openflow entries corresponding to the routing forwarding entries shown in Table 1 are shown in Table 3, and Openflow entries corresponding to the routing forwarding entries shown in Table 2 are shown in Table 4.

TABLE 3

| Serial number | Match | Action |
|---|---|---|
| 1 | DIP: 10.1.1.1/32 | OutputPort: Port1 |
| 2 | DIP: 10.1.1.2/32 | OutputPort: VXLAN Tunnel 1 Set TunnelId: 10000 |

TABLE 4

| Serial number | Match | Action |
|---|---|---|
| 1 | DIP: 10.1.1.1/32 | OutputPort: Port2 |
| 2 | DIP: 10.1.1.2/32 | OutPutPort: VXLAN Tunnel 1 Set TunnelId: 10001 |

Contents in a Match field in an Openflow entry with serial number 1 shown in Table 3 are the same as contents in a Match field in an Openflow entry with serial number 1 shown in Table 4. Contents in a Match field in an Openflow entry with serial number 2 shown in Table 3 are the same as contents in a Match field in an Openflow entry with serial number 2 shown in Table 4. Priorities of the four Openflow entries are the same.

According to the Openflow protocol, an Openflow entry is identified by its Match field and priority. Accordingly, the Openflow entry with serial number 1 shown in Table 3 is unable to be differentiated from the Openflow entry with serial number 1 shown in Table 4 on an Openflow protocol plane. The Openflow entry with serial number 2 shown in Table 3 is also unable to be differentiated from the Openflow entry with serial number 2 shown in Table 4 on the Openflow protocol plane. Consequently, after the controller distributes the four Openflow entries shown in Tables 3 and 4 to VTEP VTEP1 is unable to differentiate the Openflow entry with serial number 1 shown in Table 3 from the Openflow entry with serial number 1 shown in Table 4. Further, when converting the two Openflow entries into routing forwarding entries, VTEP1 is unable to determine VNIs corresponding to the two Openflow entries. Accordingly, VTEP1 is unable to determine that the routing forwarding entries converted from the two Openflow entries should be added to routing forwarding tables corresponding to which VNIs respectively. Similarly, it is also unable to determine that the routing forwarding entries converted from the Openflow entry with serial number 2 shown in Table 3 and the Openflow entry with serial number 2 shown in Table 4 should be added to routing forwarding tables corresponding to which VNIs respectively.

A method and apparatus for processing a flow entry are provided according to various examples of the present disclosure. The method may be applicable to the VXLAN shown in FIG. 1.

FIG. 2 is a flowchart illustrating a method for processing a flow entry in a VXLAN according to an example of the present disclosure. As shown in FIG. 2, the method includes following blocks.

At block S201, a controller generates an Openflow entry for a VTEP. A Match field in the generated Openflow entry contains a VNI corresponding to the Openflow entry.

At block S202, the controller sends the generated Openflow entry to the VTEP.

In an example, the method further includes a following process. After receiving the Openflow entry from the controller, the VTEP converts the Openflow entry into a routing forwarding entry, and adds the routing forwarding entry to a routing forwarding table corresponding to the VNI contained in the Match field in the Openflow entry. The VNI may be contained in an idle field specified in the Openflow protocol, for example, an OXM_OF_PBB_ISID field.

In an application scenario of the above method, addresses of N hosts that are connected to a VTEP but belongs to different VXLANs are the same. The VTEP is called a first VTEP, N is a natural number larger than 1 and the addresses of N hosts are called a first address. Based on the above application scenario, FIG. 3 shows a flowchart illustrating a method for processing a flow entry in a VXLAN according to another example of the present disclosure. As shown in FIG. 3, the method includes following blocks.

At block S102, a controller generates N Openflow entries for the first VTEP, where the N Openflow entries may direct the forwarding of data flows whose destination addresses are the first address. An OXM_OF_PBB_ISID field of a Match field in each Openflow entry contains a VNI corresponding to the Openflow entry.

In the Openflow protocol, the Match field includes an OXM_OF_PBB_ISID filed. The OXM_OF_PBB_ISID filed is optional, and has not been defined in the VXLAN. Accordingly, in various examples of the present disclosure, the OXM_OF_PBB_ISID field may be used to contain the VNI corresponding to the Openflow entry.

In another example, the VNI corresponding to the Openflow entry may be contained by a field similar to the OXM_OF_PBB_ISID field or an extended self-defined field.

At block S104, the controller sends the generated N Openflow entries to the first VTEP.

At block S106, the first VTEP receives the N Openflow entries from the controller.

At block S108, the first VTEP converts each of the received Openflow entries into a routing forwarding entry, and adds the routing forwarding entry to a routing forwarding table corresponding to the VNI contained in the OXM_OF_PBB_ISID field.

In an example of block S108, the first VTEP extracts the OXM_OF_PBB_ISID field in the Match field in each of the received Openflow entries, obtains the routing forwarding entry according to remained fields in the Openflow entry, and adds the obtained routing forwarding entry to the routing forwarding table corresponding to the VNI contained in the OXM_OF_PBB_ISID field.

The term "first" in "the first VTEP" and "the first address" is unrelated to a sequence, and is named for convenient and clear description.

In the solution of the above examples of the present disclosure, the Match field in the Openflow entry contains the VNI corresponding to the Openflow entry. When addresses of N hosts that are connected to a VTEP but belongs to different VXLANs are the same, the Match field in each of N Openflow entries generated by the controller for the VTEP contains the VNI corresponding to the Openflow entry. N is a natural number larger than 1, the addresses of N hosts are called address 1, and the N Openflow entries may direct the forwarding of data flows whose destination addresses are address 1. After the controller distributes the generated N Openflow entries to the VTEP, the VTEP is able to differentiate the N Openflow entries on the Openflow protocol plane according to the VNIs contained the Match fields. Further, when converting each of the Openflow entries into a routing forwarding entry, the VTEP is able to determine that the routing forwarding entry converted from the Openflow entry corresponds to the VNI contained in the Match field, and adds the routing forwarding entry to the routing forwarding table corresponding to the VNI.

The method is described by taking VTEP1 in the VXLAN shown in FIG. 1 as an example. The controller generates four Openflow entries for VTEP1 according to block S102, as shown in Table 5.

TABLE 5

| Serial number | Match | Action |
|---|---|---|
| 1 | DIP: 10.1.1.1/32<br>OXM_OF_PBB_ISID: 10000 | OutPutPort: Port1 |
| 2 | DIP: 10.1.1.2/32<br>OXM_OF_PBB_ISID: 10000 | OutputPort: VXLAN Tunnel 1<br>Set TunnelId: 10000 |
| 3 | DIP: 10.1.1.1/32<br>OXM_OF_PBB_ISID: 10001 | OutPutPort: Port2 |
| 4 | DIP: 10.1.1.2/32<br>OXM_OF_PBB_ISID: 10001 | OutputPort: VXLAN Tunnel 1<br>Set TunnelId: 10001 |

In Table 5, an OXM_OF_PBB_ISID field is introduced into the Match field to contain a VNI corresponding to an Openflow entry. Since values of OXM_OF_PBB_ISID fields in Match fields in Openflow entries corresponding to different VNIs are different, Openflow entries having the same destination addresses are easy to be differentiated on the Openflow protocol plane.

The controller distributes the four Openflow entries as shown in Table 5 to VTEP1. After receiving the four Openflow entries, VTEP1 may differentiate the four Openflow entries according to the OXM_OF_PBB_ISID fields in the Match fields. VTEP1 may convert each of the Openflow entries into a routing forwarding entry corresponding to the VNI in the Openflow entry. A method for converting each of the Openflow entries may be implemented as follows. The OXM_OF_PBB_ISID field in the Match field in the Openflow entry is extracted, and the value of the OXM_OF_PBB_ISID field is set as the value of the VNI. The other fields in the Openflow entry are converted into corresponding fields in the routing forwarding entry, and the routing forwarding entry is added to the routing forwarding table corresponding to the VNI. After VTEP1 converts the Openflow entries with serial numbers 1 and 2 shown in Table 5, two routing forwarding entries corresponding to VNI 10000 may be obtained, as shown in Table 3. After VTEP1 converts the Openflow entries with serial numbers 3 and 4 shown in Table 5, two routing forwarding entries corresponding to VNI 10001 may be obtained, as shown in Table 4.

Figure 4:
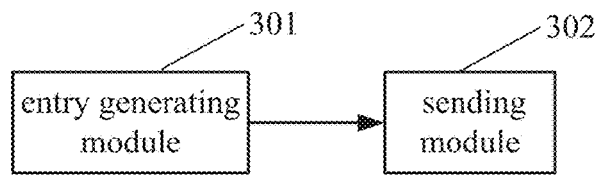
FIG. 4 is a diagram illustrating the structure of an apparatus for processing a flow entry in a VXLAN according to an example of the present disclosure.

FIG. 4 is a diagram illustrating the structure of an apparatus for processing a flow entry in a VXLAN according to an example of the present disclosure. The apparatus may be applied to a controller. As shown in FIG. 4, the apparatus includes an entry generating module 301 and a sending module 302.

The entry generating module 301 may generate an Openflow entry for a VTEP. A Match field in the generated Openflow entry contains a VNI corresponding to the Openflow entry.

The sending module 302 may send the Openflow entry generated by the entry generating module 301 to the VTEP.

In an example, the VNI is contained in an OXM_OF_PBB_ISID field specified in an Openflow protocol.

Figure 5:
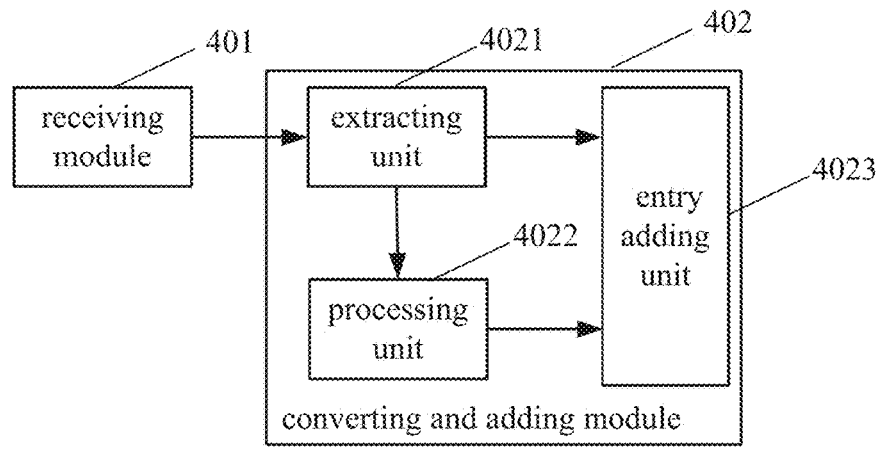
FIG. 5 is a diagram illustrating the structure of an apparatus for processing a flow entry in a VXLAN according to another example of the present disclosure.

FIG. 5 is a diagram illustrating the structure of an apparatus for processing a flow entry in a VXLAN according to another example of the present disclosure. The apparatus may be applied to a VTEP. As shown in FIG. 5, the apparatus includes a receiving module 401 and a converting and adding module 402.

The receiving module 401 may receive an Openflow entry generated for the VTEP by a controller. A Match field in the received Openflow entry contains a VNI corresponding to the Openflow entry.

The converting and adding module 402 may convert the Openflow entry received by the receiving module 401 into a routing forwarding entry, and add the routing forwarding entry to a routing forwarding table corresponding to the VNI contained in the Match field in the Openflow entry.

In an example, the VNI is contained in an OXM_OF_PBB_ISID field specified in an Openflow protocol.

In an example, the converting and adding module 402 includes an extracting unit 4021, a processing unit 4022 and an entry adding unit 4023.

The extracting unit 4021 may extract the OXM_OF_PBB_ISID field in the Match field in the Openflow entry received by the receiving module 401.

The processing unit 4022 may obtain the routing forwarding entry according to remained fields in the Openflow entry after the extracting unit 4021 extracts the OXM_OF_PB-B_ISID field in the Match field in the Openflow entry.

The entry adding unit 4023 may add the routing forwarding entry obtained by the processing unit 4022 to the routing forwarding table corresponding to the VNI contained in the OXM_OF_PBB_ISID field extracted by the extracting unit 4021.

In various examples, the controller and the VTEP in the VXLAN may be programmable devices. A hardware structure of the controller may refer to FIG. 6, and a hardware structure of the VTEP may refer to FIG. 7.

Figure 6:
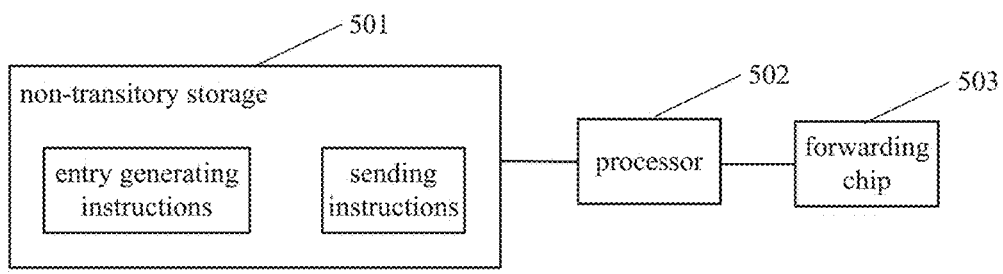
FIG. 6 is a diagram illustrating a hardware structure of a controller according to an example of the present disclosure.

FIG. 6 is a diagram illustrating a hardware structure of a controller according to an example of the present disclosure. The controller includes a non-transitory storage 501, a processor 502 (for example, a CPU) communicating with the non-transitory storage 501, and a forwarding chip 503.

The non-transitory storage 501 may store machine readable instructions, including entry generating instructions and sending instructions that can be executed by the processor 502.

The processor 502 may communicate with the forwarding chip 503 to send a generated Openflow entry to the forwarding chip 503.

The processor 502 may read the entry generating instructions stored in the non-transitory storage 501 to perform a process of:

generating an Openflow entry for a VTEP, where a Match field in the generated Openflow entry contains a VNI corresponding to the Openflow entry.

The processor 502 may read the sending instructions stored in the non-transitory storage 501 to perform a process of:

sending the generated Openflow entry to the VTEP.

In an example, the VNI is contained in an OXM_OF_PBB_ISID field specified in an Openflow protocol.

The forwarding chip 503 may send the Openflow entry received from the processor 502 to the VTEP.

Figure 7:
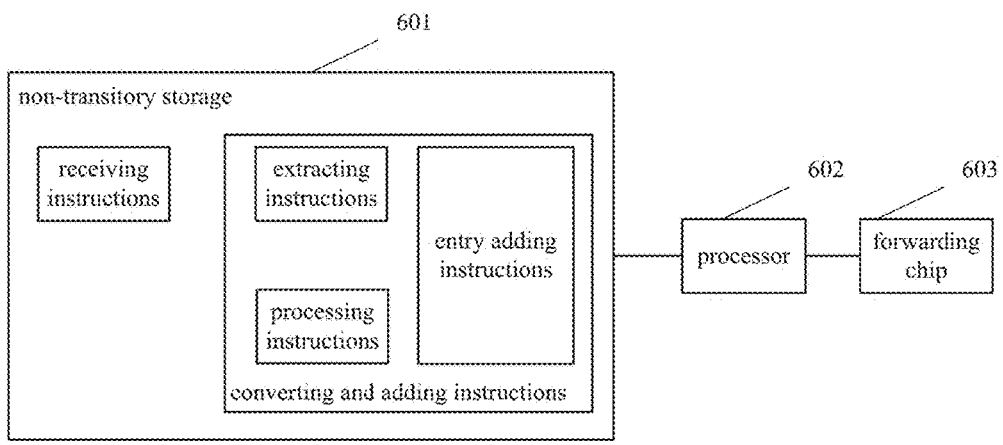
FIG. 7 is a diagram illustrating a hardware structure of a VTEP according to an example of the present disclosure.

FIG. 7 is a diagram illustrating a hardware structure of a VTEP according to an example of the present disclosure. The VTEP includes a non-transitory storage 601, a processor 602 (for example, a CPU) communicating with the non-transitory storage 601, and a forwarding chip 603.

The non-transitory storage 601 may store machine readable instructions, including receiving instructions and converting and adding instructions that can be executed by the processor 602.

The processor 602 may communicate with the forwarding chip 603 to receive an Openflow entry from the forwarding chip 503.

The processor 602 may read the receiving instructions stored in the non-transitory storage 601 to perform a process of:

receiving an Openflow entry generated for the VTEP by a controller, where a Match field in the received Openflow entry contains a VNI corresponding to the Openflow entry.

The processor 602 may read the converting and adding instructions stored in the non-transitory storage 601 to perform a process of:

converting the received Openflow entry into a routing forwarding entry, and adding the routing forwarding entry to a routing forwarding table corresponding to the VNI contained in the Match field in the Openflow entry.

The forwarding chip 503 may send the Openflow entry received from the controller to the processor 602.

In an example, the VNI is contained in an OXM_OF_PBB_ISID field specified in an Openflow protocol.

In an example, the converting and adding instructions may include extracting instructions, processing instructions and entry adding instructions.

The processor 602 may read the extracting instructions stored in the non-transitory storage 601 to perform a process of:

extracting the OXM_OF_PBB_ISID field in the Match field in the received Openflow entry.

The processor 602 may read the processing instructions stored in the non-transitory storage 601 to perform a process of:

obtaining the routing forwarding entry according to remained fields in the Openflow entry after the OXM_OF_PBB_ISID field in the Match field in the received Openflow entry is extracted.

The processor 602 may read the entry adding instructions stored in the non-transitory storage 601 to perform a process of:

adding the routing forwarding entry to the routing forwarding table corresponding to the VNI contained in the extracted OXM_OF_PBB_ISID field.

In the solution of the above examples of the present disclosure, the Match field in the Openflow entry contains the VNI corresponding to the Openflow entry. When addresses of N hosts that are connected to a VTEP but belongs to different VXLANs are the same, the Match field in each of N Openflow entries generated by the controller for the VTEP contains the VNI corresponding to the Openflow entry. N is a natural number larger than 1, the addresses of N hosts are called address 1, and the N Openflow entries may direct the forwarding of data flows whose destination addresses are address 1. After the controller distributes the generated N Openflow entries to the VTEP, the VTEP is able to differentiate the N Openflow entries on the Openflow protocol plane according to the VNIs contained the Match fields. Further, when converting each of the Openflow entries into a routing forwarding entry, the VTEP is able to determine that the routing forwarding entry converted from the Openflow entry corresponds to the VNI contained in the Match field, and adds the routing forwarding entry to the routing forwarding table corresponding to the VNI.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for processing a first flow entry and a second flow entry in a Virtual eXtensible Local Area Network (VXLAN), comprising:

generating, by a controller, a first Software Defined Network (SDN) entry for a VXLAN Tunnel End Point (VTEP), the first SDN entry including a first Match field containing a first VXLAN Network Identifier (VNI) corresponding to the first SDN entry and to a first VXLAN of the VTEP;

sending, by the controller, the generated first SDN entry to the VTEP;
receiving, by the VTEP, the first SDN entry;
converting, by the VTEP, the received first SDN entry into a first routing forwarding entry that forwards packets containing the first VNI to a device of the first VXLAN;
generating, by the controller, a second SDN entry for the VTEP, the SDN entry including a second Match field containing a second VNI corresponding to the second SDN entry and to a second VXLAN of the VTEP;
sending, by the controller, the generated second SDN entry to the VTEP;
receiving, by the VTEP, the second SDN entry; and
converting, by the VTEP, the received second SDN entry into a second routing forwarding entry that forwards packets containing the second VNI to a device of the second VXLAN.

2. The method of claim 1, wherein the first VNI and second VNI are contained in an idle field specified in an SDN protocol.

3. The method of claim 1, further comprising adding the first routing forwarding entry and the second routing forwarding entry to a first routing forwarding table and a second routing forwarding table corresponding to the first VNI and the second VNI, respectively.

4. The method of claim 3, wherein adding the first routing forwarding entry and the second routing forwarding entry to the first routing forwarding table and the second routing forwarding table corresponding to the first VNI and the second VNI contained in the Match field in the first SDN entry and the second SDN entry, respectively, comprises:
extracting the idle field in the Match field in the first SDN entry and the second SDN entry, respectively;
obtaining the first routing forwarding entry and the second routing forwarding entry according to the remaining fields in the first SDN entry and the second SDN entry, respectively; and
adding the first routing forwarding entry and the second routing forwarding entry to the first routing forwarding table and the second routing forwarding table corresponding to the first VNI and the second VNI, respectively, contained in the idle field.

5. A method for processing a first flow entry and a second flow entry in a Virtual eXtensible Local Area Network (VXLAN), comprising:
receiving, by a VXLAN Tunnel End Point (VTEP), a first Software Defined Network (SDN) entry generated for the VTEP by a controller, the SDN entry including a Match field containing a first VXLAN Network Identifier (VNI) corresponding to the first SDN entry and to a first VXLAN of the VTEP;
converting, by the VTEP, the received first SDN entry into a first routing forwarding entry;
adding the first routing forwarding entry to a first routing forwarding table corresponding to the first VNI contained in the Match field in the first SDN entry;
receiving, by a VXLAN Tunnel End Point (VTEP), a second Software Defined Network (SDN) entry generated for the VTEP by a controller, the second SDN entry including a Match field containing a second VXLAN Network Identifier (VNI) corresponding to the second SDN entry and to a second VXLAN of the VTEP;
converting, by the VTEP, the received second SDN entry into a second routing forwarding entry; and
adding the second routing forwarding entry to a second routing forwarding table corresponding to the second VNI contained in the Match field in the second SDN entry.

6. The method of claim 5, wherein the first VNI and the second VNI are contained in an idle field specified in an SDN protocol.

7. The method of claim 6, wherein adding the first routing forwarding entry and the second routing forwarding entry to the first routing forwarding table and the second routing forwarding table, respectively, corresponding to the first VNI and the second VNI contained in the Match field in the first SDN entry and the second SDN entry, respectively, comprises:
extracting the idle field in the Match field in the first SDN entry and the second SDN entry, respectively;
obtaining the first routing forwarding entry and the second routing forwarding entry according to remained fields in the first SDN entry and the second SDN entry, respectively; and
adding the first routing forwarding entry and the second routing forwarding entry to the first routing forwarding table and the second routing forwarding table corresponding to the first VNI and the second VNI, respectively, contained in the idle field.

8. An apparatus for processing a first flow entry and a second flow entry in a Virtual eXtensible Local Area Network (VXLAN), applicable to a controller and comprising:
an entry generating module, to generate a first Software Defined Network (SDN) entry and a second SDN entry for a VXLAN Tunnel End Point (VTEP), each of the first SDN entry and the second SDN entry including a Match field containing a first VXLAN Network Identifier (VNI) and a second VNI, respectively, corresponding to the first SDN entry and the second SDN entry, respectively;
a sending module, to send the generated first SDN entry and the generated second SDN entry to the VTEP; and
a converting and adding module, to convert the received first SDN entry and the received second SDN entry into a first routing forwarding entry and a second routing forwarding entry, respectively, and add the first routing forwarding entry and the second routing forwarding entry to a first routing forwarding table and a second routing forwarding table corresponding to the first VNI and the second VNI, respectively, contained in the Match field in the first SDN entry and the second SDN entry, respectively.

9. The apparatus of claim 8, wherein the first VNI and the second VNI are contained in an idle field specified in an SDN protocol.

10. The apparatus of claim 8, wherein adding the first routing forwarding entry and the second routing forwarding entry to the first routing forwarding table and the second routing forwarding table corresponding to the first VNI and the second VNI contained in the Match field in the first SDN entry and the second SDN entry, respectively, comprises:
extracting the idle field in the Match field in the first SDN entry and the second SDN entry, respectively;
obtaining the first routing forwarding entry and the second routing forwarding entry according to the remaining fields in the first SDN entry and the second SDN entry, respectively; and
adding the first routing forwarding entry and the second routing forwarding, entry to the first routing forwarding table and the second routing forwarding table corresponding to the first VNI and the second VNI, respectively, contained in the idle field.

11. An apparatus for processing a first flow entry and a second flow entry in a Virtual eXtensible Local Area Network (VXLAN), applicable to a VXLAN Tunnel End Point (VTEP) and comprising:
a receiving module, to receive a first Software Defined Network (SDN) entry and a second SDN entry generated for the VTEP by a controller, the first SDN entry and the second SDN entry each including a Match field containing a first VXLAN Network Identifier (VNI) and a second VNI corresponding to the first SDN entry and the second SDN entry, respectively; and
a converting and adding module, to convert the received first SDN entry and the second SDN entry into a first routing forwarding entry and a second routing forwarding entry, respectively, and add the first routing forwarding entry and the second routing forwarding entry to a first routing table and a second routing forwarding table, respectively, corresponding to the first VNI and the second VNI contained in the Match field in the first SDN entry and the second SDN entry, respectively.

12. The apparatus of claim 11, wherein the first VNI and the second VNI are contained in an idle field specified in an SDN protocol.

13. The apparatus of claim 12, wherein the converting and adding module comprises:
an extracting unit, to extract the idle field in the Match field in the first SDN entry and the second SDN entry received by the receiving module;
a processing unit, to obtain the first routing forwarding entry and the second routing forwarding entry according to the remaining fields in the first SDN entry and the second SDN entry after the extracting unit extracts the idle field; and
an entry adding unit, to add the first routing forwarding entry and the second routing forwarding entry obtained by the processing unit to the first routing forwarding table and the second routing forwarding table, respectively, corresponding to the first VNI and the second VNI contained in the idle field extracted by the extracting unit.

14. The apparatus of claim 11, wherein adding the first routing forwarding entry and the second routing forwarding entry to the first routing forwarding table and the second routing forwarding table corresponding to the first VNI and the second VNI contained in the Match field in the first SDN entry and the second SDN entry, respectively, comprises:
extracting the idle field in the Match field in the first SDN entry and the second SDN entry, respectively;
obtaining the first routing forwarding entry and the second routing forwarding entry according to the remaining fields in the first SDN entry and the second SDN entry, respectively; and
adding the first routing forwarding entry and the second routing forwarding entry to the first routing forwarding table and the second routing forwarding table corresponding to the first VNI and the second VNI, respectively, contained in the idle field.

15. A non-transitory storage medium storing machine readable instructions that are executable by a processor in a controller to implement a process of:
generating a first Software Defined Network (SDN) entry for a VXLAN Tunnel End Point (VTEP), the first SDN entry including a Match field in the generated first SDN entry containing a first VXLAN Network Identifier (VNI) corresponding to the first SDN entry;

generating a second SDN entry for the VTEP, the second SDN entry including a Match field in the generated second SDN entry containing a second VNI corresponding to the second SDN entry;
sending the generated first SDN entry and the generated second SDN entry to the VTEP;
receiving the first SDN entry and the second SDN entry; and
converting the received first SDN entry and the received second SDN entry into a first routing forwarding entry and a second routing forwarding entry, respectively.

16. The non-transitory storage medium of claim 15, wherein the first VNI and the second VNI are contained in an idle field specified in an SDN protocol.

17. The non-transitory storage medium of claim 16, wherein the machine readable instructions include instructions that, when executed by a processor, cause the processor to:
extract the idle field in the Match field in the first SDN entry and the second SDN entry, respectively;
obtain the first routing forwarding entry and the second routing forwarding entry according to the remaining fields in the first SDN entry and the second SDN entry, respectively; and
add the first routing forwarding entry and the second routing forwarding entry to the first routing forwarding table and the second routing forwarding table corresponding to the first VNI and the second VNI, respectively, contained in the idle field.

18. A non-transitory storage medium storing machine readable instructions that are executable by a processor in a Virtual eXtensible Local Area Network (VXLAN) Tunnel End Point (VTEP) to implement a process of:
receiving a first Software Defined Network (SDN) entry generated for the VTEP by a controller, the first SDN entry including a Match field in the first received SDN entry containing a first VXLAN Network Identifier (VNI) corresponding to the first SDN entry;
receiving a second SDN entry generated for the VTEP by a controller, the second SDN entry including a Match field in the second received SDN entry containing a second VNI corresponding to the second SDN entry; and
converting the received first SDN entry and the received second SDN entry into a first routing forwarding entry and a second routing forwarding entry, respectively, and adding the first routing forwarding entry and the second routing forwarding entry to a first routing forwarding table and a second routing forwarding table, respectively, corresponding to the first VNI and the second VNI contained in the Match field in the first SDN entry and the second SDN entry, respectively.

19. The non-transitory storage medium of claim 18, wherein the first VNI and the second VNI are contained in an idle field specified in an SDN protocol.

20. The non-transitory storage medium of claim 19, wherein the machine readable instructions comprises:
extracting instructions, to extract the idle field in the Match field in the received first SDN entry and the second SDN entry;
processing instructions, to obtain the first routing forwarding entry and the second routing forwarding entry according to the remaining fields in the first SDN entry and the second SDN entry after the idle field in the Match field in, the received first SDN entry and the received second SDN entry, respectively, are extracted; and entry adding instructions, to add the first routing forwarding entry and the second routing forwarding entry to the first routing forwarding table and the second routing forwarding table, respectively, corresponding to the first VNI and the second VNI contained in the extracted idle field, respectively.

* * * * *